(12) United States Patent
Kim et al.

(10) Patent No.: US 9,381,882 B2
(45) Date of Patent: Jul. 5, 2016

(54) EXTERNAL AIRBAG DEPLOYMENT METHOD AND SYSTEM

(71) Applicants: Hyundai Motor Company, Seoul (KR); Kia Motors Corporation, Seoul (KR)

(72) Inventors: Yong Sun Kim, Gyeonggi-do (KR); Seoung Hoon Lee, Gyeonggi-do (KR); Ki Jin Kwon, Gyeonggi-do (KR); Jin Ho Bae, Gyeonggi-do (KR); Han Sung Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 64 days.

(21) Appl. No.: 14/294,641

(22) Filed: Jun. 3, 2014

(65) Prior Publication Data

US 2014/0277950 A1    Sep. 18, 2014

Related U.S. Application Data

(62) Division of application No. 13/846,284, filed on Mar. 18, 2013, now abandoned.

(30) Foreign Application Priority Data

Dec. 10, 2012  (KR) .................. 10-2012-0142615

(51) Int. Cl.
| | |
|---|---|
| *B60R 21/36* | (2011.01) |
| *B60R 21/0134* | (2006.01) |
| *B60R 21/0136* | (2006.01) |
| *B60R 21/01* | (2006.01) |
| *B60R 21/013* | (2006.01) |

(52) U.S. Cl.
CPC ......... *B60R 21/0134* (2013.01); *B60R 21/0136* (2013.01); *B60R 21/36* (2013.01); *B60R 2021/01013* (2013.01); *B60R 2021/0119* (2013.01); *B60R 2021/01311* (2013.01); *B60R 2021/01313* (2013.01)

(58) Field of Classification Search
None
See application file for complete search history.

(56) References Cited

U.S. PATENT DOCUMENTS

| | | |
|---|---|---|
| 5,646,613 A | 7/1997 | Cho |
| 6,085,151 A | 7/2000 | Farmer et al. |

(Continued)

FOREIGN PATENT DOCUMENTS

| | | |
|---|---|---|
| JP | 2008-247277 A | 10/2008 |
| KR | 10-2012-0013799 | 2/2012 |
| KR | 10-2012-0063626 A | 6/2012 |

*Primary Examiner* — John R Olszewski
*Assistant Examiner* — Jason Roberson
(74) *Attorney, Agent, or Firm* — Mintz Levin Cohn Ferris Glovsky and Popeo, P.C.

(57) ABSTRACT

Disclosed herein is an external airbag deployment method. The method includes setting, by a controller, a detection area located in front. In addition, the method includes setting, by the controller, a target object from objects detected in the detection area, when an object has a relative velocity greater than a first reference, an overlap greater than a second reference, and a TTE less than a third reference, wherein TTE is a remaining time until the object collides with an airbag cushion when the external airbag is predicted to be deployed. Furthermore, the method includes determining, by the controller, whether a relative velocity and an overlap, predicted at a time when the target object is predicted to collide with the vehicle, are greater than predetermined levels and deploying the external airbag when the predicted relative velocity and overlap are greater than the predetermined levels.

2 Claims, 13 Drawing Sheets

(56) References Cited

U.S. PATENT DOCUMENTS

| | | | |
|---|---|---|---|
| 6,227,325 B1 | 5/2001 | Shah | |
| 6,408,237 B1 | 6/2002 | Cho | |
| 6,420,996 B1 | 7/2002 | Stopczynski et al. | |
| 6,519,519 B1 | 2/2003 | Stopczynski | |
| 6,883,631 B2 | 4/2005 | Hu et al. | |
| 6,944,544 B1 * | 9/2005 | Prakah-Asante | B60R 21/0134 342/42 |
| 7,806,221 B2 | 10/2010 | Mishra | |
| 2003/0135317 A1 * | 7/2003 | Hijikata | B60K 26/021 701/70 |
| 2003/0149530 A1 | 8/2003 | Stopczynski | |
| 2003/0154011 A1 | 8/2003 | Rao et al. | |
| 2004/0083042 A1 | 4/2004 | Strumolo et al. | |
| 2004/0107033 A1 * | 6/2004 | Rao | B60R 21/0156 701/45 |
| 2004/0117116 A1 | 6/2004 | Rao et al. | |
| 2005/0131646 A1 | 6/2005 | Camus | |
| 2006/0085131 A1 | 4/2006 | Yopp et al. | |
| 2006/0091654 A1 | 5/2006 | De Mersseman et al. | |
| 2006/0213714 A1 | 9/2006 | Igawa | |
| 2006/0253240 A1 * | 11/2006 | Rao | B60W 50/035 701/48 |
| 2007/0045026 A1 | 3/2007 | Theisen | |
| 2008/0309060 A1 | 12/2008 | Hakki et al. | |
| 2009/0010495 A1 | 1/2009 | Schamp et al. | |
| 2009/0195371 A1 | 8/2009 | Camus | |
| 2009/0218157 A1 | 9/2009 | Rammer | |
| 2009/0326766 A1 | 12/2009 | Wang | |
| 2010/0057305 A1 | 3/2010 | Breed | |
| 2012/0045119 A1 | 2/2012 | Schamp | |
| 2013/0251193 A1 | 9/2013 | Schamp | |
| 2014/0044310 A1 | 2/2014 | Schamp et al. | |

* cited by examiner

EXTERNAL AIRBAG DEPLOYMENT METHOD AND SYSTEM

CROSS REFERENCE

This application is a Division Application of U.S. patent application Ser. No. 13/846,284, filed Mar. 18, 2013, which claims under 35 U.S.C. §119(a) the benefit of Korean Patent Application No. 10-2012-0142615 filed Dec. 10, 2012, the entire contents of which are incorporated herein by reference.

BACKGROUND OF THE INVENTION

1. Field of the Invention

The present invention relates, in general, to an external air bag deployment method, for a vehicle which is configured to predict a collision and deploy an external airbag at time of the collision based on the results of the prediction, without causing false operation.

2. Description of the Related Art

Recently, an external airbag that is outwardly deployed from the front or rear side of a vehicle has been developed and presented as a technology for improving the vehicle safety. This technology is configured to deploy an external airbag by detecting and predicting a vehicle collision. However, in this technology maximum shock absorption effects must be obtained by deploying the external airbag at a precise time of collision, and stability must be improved by correctly deploying the external airbag at a time point at which the airbag must be deployed, and system reliability must be improved by preventing the airbag from being falsely deployed at a time point at which the airbag must not be deployed.

A conventional method of controlling an airbag module using information obtained prior to a collision includes detecting information regarding an object located in front of a vehicle using an ultrasonic sensor and radar sensor mounted in the vehicle; comparing information regarding a distance to the object detected by the ultrasonic sensor with information about a distance to the object detected by the radar sensor; selecting at least one of the information regarding the object detected by the ultrasonic sensor and the information regarding the same object detected by the radar sensor based on the results of the comparison of the distance information, and determining whether the object is located in an area when there is a possibility that the object may collide with the vehicle, based on the selected information; and the fourth step of deploying an airbag module installed within the vehicle, based on the results of the determination of whether the object is located in the area where there is a possibility that the object may collide with the vehicle.

The foregoing is intended merely to aid in the better understanding of the background of the present invention, and is not intended to mean that the present invention falls within the purview of the related art that is already known to those skilled in the art.

SUMMARY

Accordingly, the present invention provides an external airbag deployment method, which is implemented in a vehicle and is configured to predict a potential collision and deploy an external airbag at a substantially precise time based on the results of the prediction, without causing false operation.

Specifically, the present invention provides an external airbag deployment method including setting a detection area located in front of a vehicle; selecting a target object from objects detected in the detection area, when an object has a relative velocity greater than a first reference, an overlap greater than a second reference, and a Time To EAB (External Airbag) (TTE) less than a third reference, wherein TTE is a remaining time until the object collides with an airbag cushion when the external airbag is predicted to be deployed; determining whether a relative velocity and an overlap, predicted at a time when the target object is predicted to collide with the vehicle, are greater than predetermined levels; and deploying the external airbag when the relative velocity and the overlap, predicted at a time when the target object is predicted to collide with the vehicle, are greater than the predetermined levels.

Furthermore, the setting of the detection area may include recognizing objects detected in the detection area, assigning identifications (IDs) to the detected objects, and updating detected objects when measurement is performed by a front sensor. In addition, data regarding the detected objects and the target object may be updated at intervals of a measurement period of the front sensor, and the predicted data may be calculated at intervals of a predetermined time during each measurement period and may be used as data regarding the detected objects and the target object. The predetermined levels may be given as the first reference for the relative velocity and as the second reference for the overlap.

Further, the present invention provides an external airbag deployment method including setting a detection area located in front of a vehicle; selecting an object having a shortest Time To EAB (External Airbag) (TTE), from objects detected in the detection area, as a dangerous object, wherein the TTE is a remaining time until the object collides with an airbag cushion when the external airbag is predicted to be deployed; selecting the dangerous object as a target object when the dangerous object has a relative velocity greater than a first reference, an overlap greater than a second reference, and a TTE less than a third reference; determining whether a relative velocity and an overlap, predicted at a time when the target object is predicted to collide with the vehicle, are greater than predetermined levels; and deploying the external airbag when the predicted relative velocity and overlap of the target object are greater than the predetermined levels.

Moreover, selecting the target object may include selecting an object having a shortest Time To Collision (TTC), from the detected objects, as a dangerous object, wherein the TTC is a remaining time until the object collides with the vehicle when the object is predicted to collide with the vehicle.

Furthermore, the present invention provides an external airbag deployment method including setting a detection area located in front of a vehicle; selecting the object as a target object from objects detected in the detection area, when an object has a relative velocity greater than a first reference, an overlap greater than a second reference, and a Time To EAB (External Airbag) (TTE) less than a third reference, wherein TTE is a remaining time until the object collides with an airbag cushion when the external airbag is predicted to be deployed; determining whether the vehicle is stable by comparing a predicted yaw rate of the vehicle with a measured yaw rate; determining whether a relative velocity and an overlap, predicted at a time when the target object is predicted to collide with the vehicle, are greater than predetermined levels; and deploying the external airbag when the vehicle is stable and the predicted relative velocity and overlap of the target object are greater than the predetermined levels.

Additionally, the process may include determining whether a collision probability based on a reciprocal of a Time To Collision (TTC) and a variation in collision probability are greater than predetermined levels, wherein the TTC is a remaining time until the target object collides with the vehicle at a time when the target object is predicted to collide with the vehicle, and deploying the external airbag when the vehicle is stable, the predicted relative velocity and overlap of the target object are greater than predetermined levels, and the collision probability and the variation in the collision probability are greater than predetermined levels.

Furthermore, the process may include calculating a required steering avoidance distance and a required braking avoidance distance based on a relative velocity of the target object; comparing a distance to the target object with the required steering avoidance distance and the required braking avoidance distance, and e deploying the external airbag when the vehicle is stable, the predicted relative velocity and overlap of the target object are greater than the predetermined levels, and the distance to the target object is less than the required steering avoidance distance and the required braking avoidance distance.

In addition, the present invention provides an external airbag deployment method including setting a detection area located in front of a vehicle; selecting the object as a target object from objects detected in the detection area, when an object has a relative velocity greater than a first reference, an overlap greater than a second reference, and a Time To EAB (External Airbag) (TTE) less than a third reference, wherein TTE is a remaining time until the object collides with an airbag cushion when the external airbag is predicted to be deployed; determining whether a relative velocity and an overlap, predicted at a time when the target object is predicted to collide with the vehicle, are greater than predetermined levels; validating presence of the target object using an ultrasonic sensor; and deploying the external airbag when the relative velocity and the overlap, predicted at a time when the target object is predicted to collide with the vehicle, are greater than the predetermined levels and when the presence of the target object is validated.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
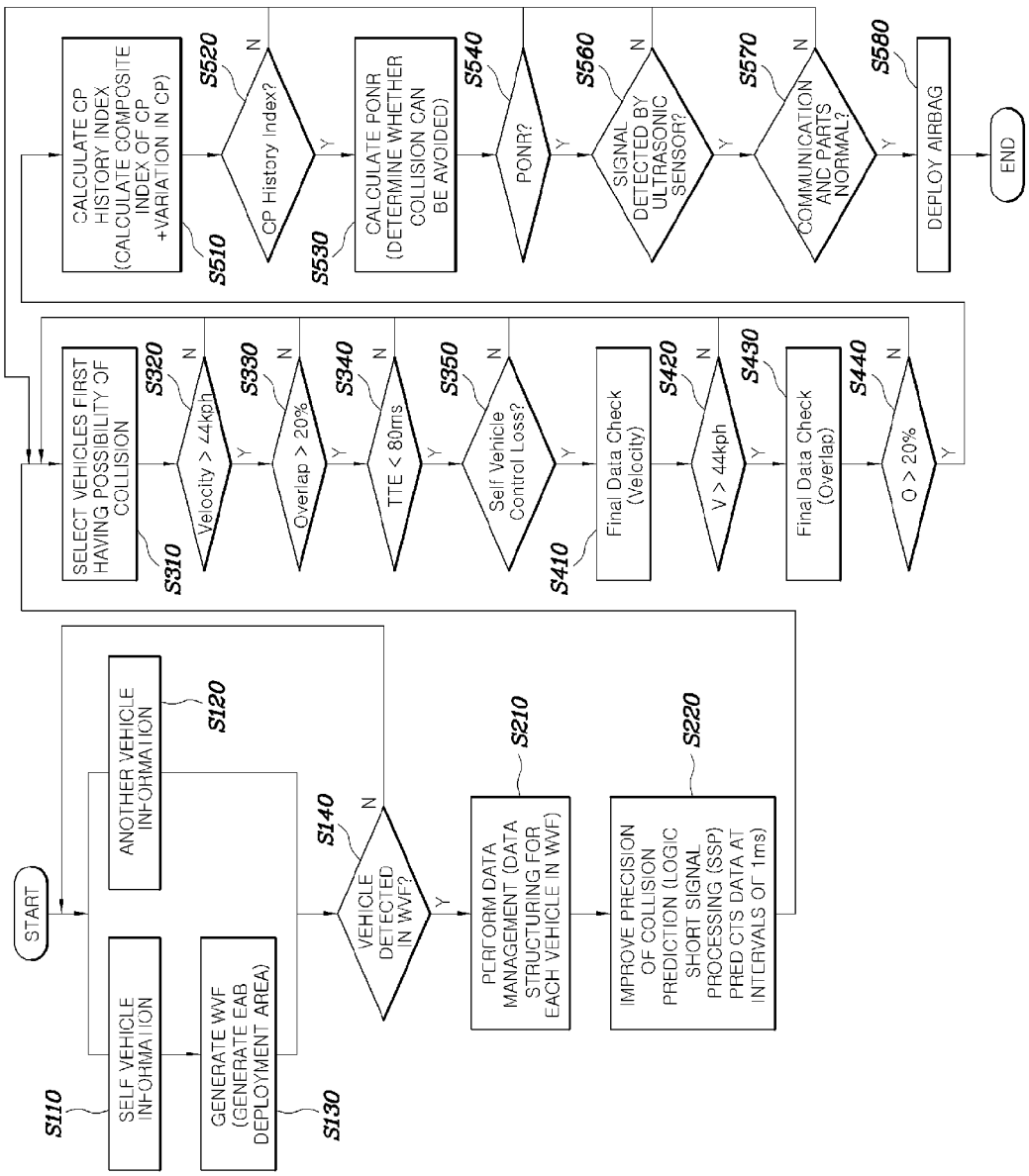
FIG. 1 is an exemplary flowchart showing an external airbag deployment method according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, embodiments of an external airbag deployment method according to the present invention will be described in detail with reference to the accompanying drawings.

Reference now should be made to the drawings, in which the same reference numerals are used throughout the different drawings to designate the same or similar components.

FIG. 1 is an exemplary flowchart showing an external airbag deployment method according to an embodiment of the present invention.

An external airbag deployment method according to the present invention may include setting, by a controller, a detection area located in front of a vehicle; selecting, by the controller, a target object from objects detected in the detection area, when an object has a relative velocity greater than a first reference, an overlap greater than a second reference, and a Time To EAB (External Airbag) (TTE) less than a third reference, wherein TTE is the remaining time until the object collides with an airbag cushion when the external airbag is predicted to be deployed; determining, by the controller, whether a relative velocity and an overlap, predicted at a time when the target object is predicted to collide with the vehicle, are greater than predetermined levels; and deploying the external airbag when the relative velocity and the overlap of the target object, predicted at a time when the target object is predicted to collide with the vehicle, are greater than the predetermined levels.

First, information regarding an autonomous vehicle may be obtained, and information regarding another object may be obtained at steps S110 and S120. The information regarding the autonomous vehicle may be obtained using sensors for measuring the physical characteristic of the autonomous vehicle. The information regarding the other object may be measured using sensors, such as a laser sensor, a radar sensor, and an imaging device disposed within the autonomous vehicle.

In particular, the information regarding the autonomous vehicle obtained by the sensors is given as follows in Table 1.

TABLE 1

| Sensor | No | Information transferred to ACU |
|---|---|---|
| Vehicle velocity sensor | 1 | FL(Front left) wheel speed |
| | 2 | FR (Front right) wheel speed |
| | 3 | RL (Rear Left) wheel speed |
| | 4 | RR (Rear Right) wheel speed |
| Brake sensor | 5 | M/Cylinder pressure (MPa) |
| | 6 | Wheel slip ratio |
| | 7 | |
| | 8 | |
| Acceleration sensor | 9 | Longitudinal acceleration |
| | 10 | Lateral acceleration |
| Yaw rate sensor | 11 | Yaw rate (rad/sec) |
| | 12 | |
| Wheel angle sensor | 13 | Steering wheel angle |
| | 14 | |

In addition, information regarding the other object, obtained by the sensors, is given as follows in Table 2.

TABLE 2

| Sensor | No | Information transferred to ACU |
|---|---|---|
| Radar(40 ms) | 1 | Relative velocity |
| | 2 | Relative distance |
| | 3 | Longitudinal position |
| | 4 | Lateral position |
| | 5 | Tracking ID |
| | 6 | TTC (time to collision) |
| Camera (80 ms) | 7 | Classification information |
| | 8 | Object width |
| | 9 | Longitudinal position |
| | 10 | Lateral position |
| | 11 | |
| | 12 | |
| | 13 | |
| | 14 | |
| Ultrasonic (10 ms) | 15 | Relative distance |
| | 16 | |

TABLE 3

| No | Information transferred to ACU |
|---|---|
| 1 | Object ID |
| 2 | Position X |
| 3 | Position Y |
| 4 | Velocity X |
| 5 | Velocity Y |
| 6 | Object age |
| 7 | Object prediction age |
| 8 | Object time offset |
| 9 | Object classification |

Furthermore, using the information obtained by the sensors, a controller disposed in autonomous vehicle may obtain relative information and absolute information regarding the autonomous vehicle and another object, as shown above in Table 3. All of the relative and absolute information may be used in the following procedure.

Figure 2:
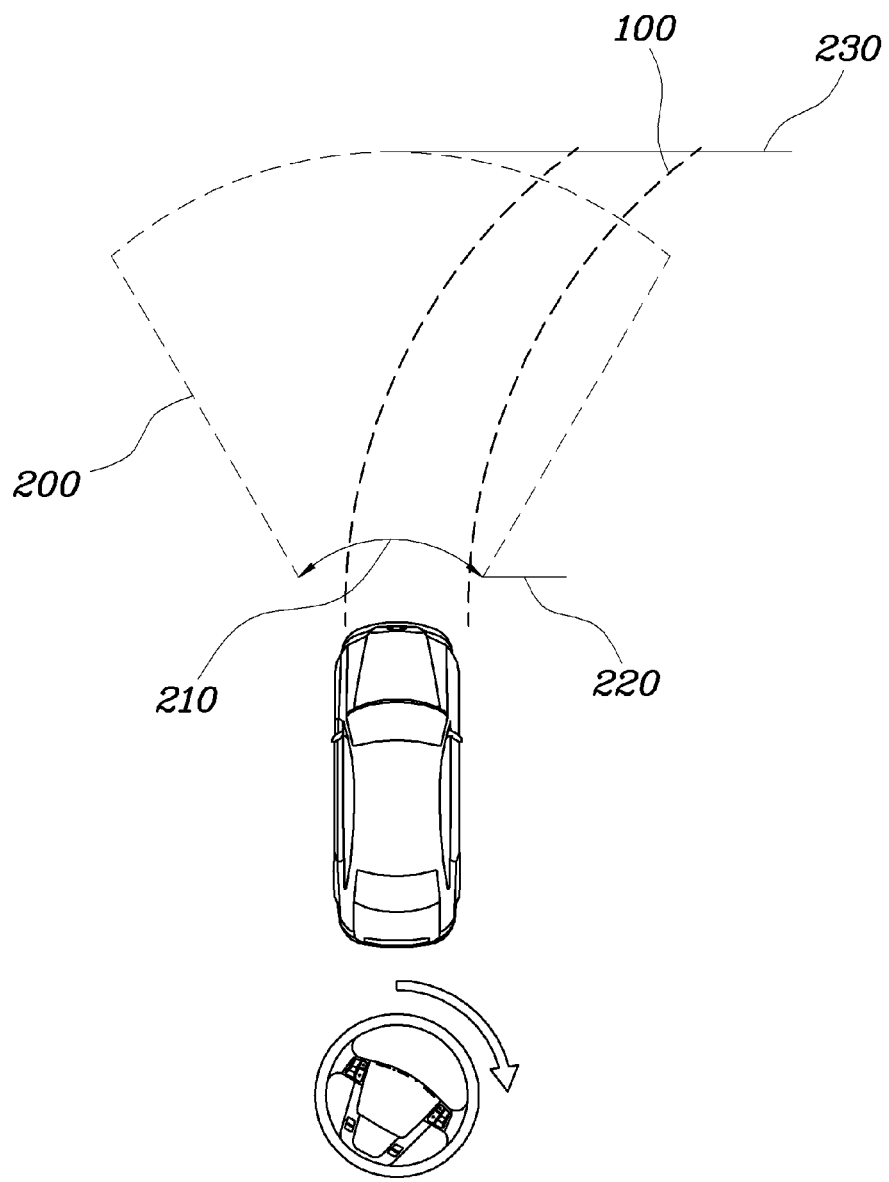
FIGS. 2 and 3 are exemplary diagrams showing the detection area of the external airbag deployment method according to an exemplary embodiment of the present invention.
Figure 3:
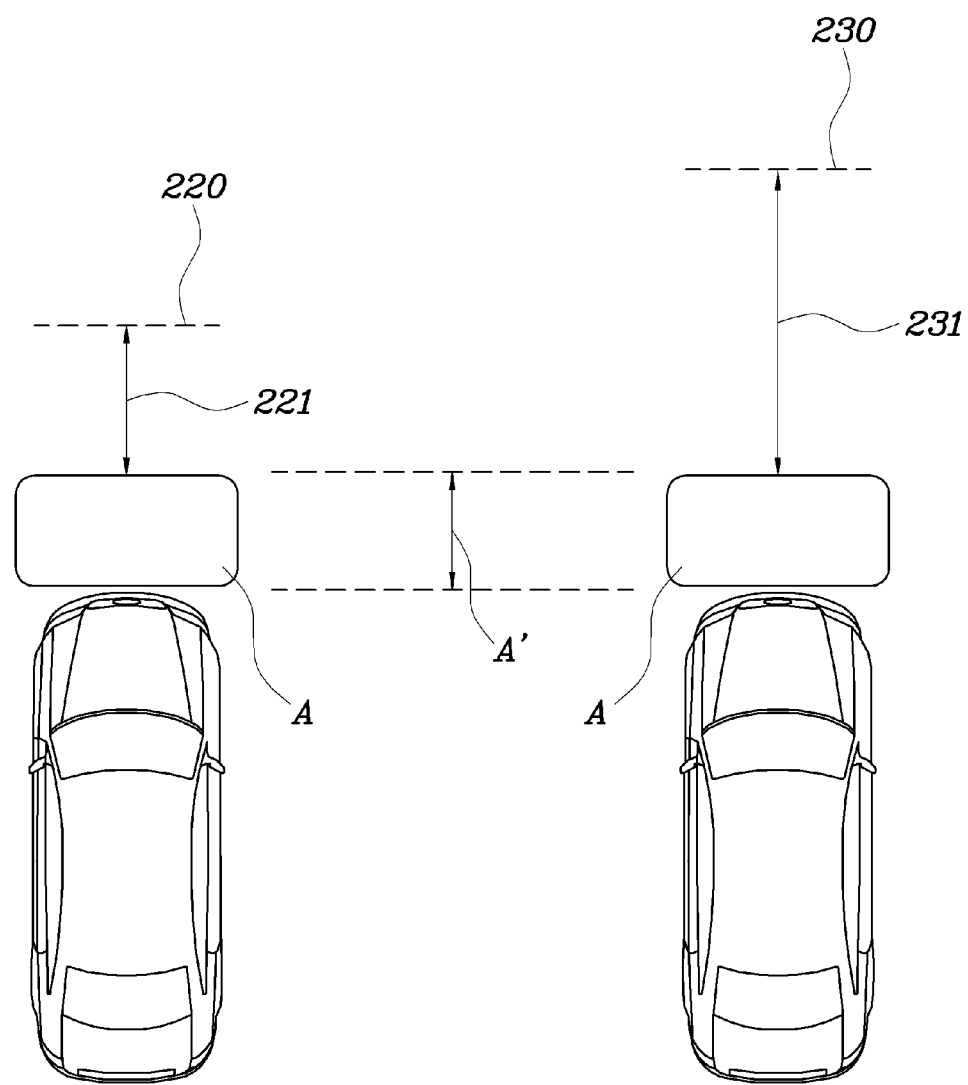

Further, the process may include setting S130, by the controller, the detection area located in front of the vehicle (also referred to as a Wide Vehicle Funnel: WVF). As shown in FIG. 2, the controller may be configured to set a basic area 100 which is moved to correspond with the steering movement of the vehicle, and a real area 200 in which the time of the external airbag of the vehicle and the velocity of the vehicle are taken into consideration.

In particular, the basic area may be obtained by calculating a radius of rotation of the vehicle using a vehicle width and a steering angle and by offsetting the radius of rotation to opposite sides of the vehicle. Such a radius of rotation of the vehicle may be derived by the following Equation (1):

$$\rho = \frac{W}{2} \cdot \frac{W_{RL} - W_{RR}}{W_{RL} + W_{RR}}, \text{ (calculation of radius of rotation)} \quad (1)$$

when W denotes the wheel base of the vehicle, and $W_{RX}$ denotes the wheel speed of the vehicle.

Further, the fan shaped real area may be set based on the relative velocity of the vehicle and the deployment time of the external airbag. In other words, when the time required to fully deploy the external airbag is assumed to be 65 ms, the limit of a minimum real area may be obtained based on the time during which the cushion of the airbag is fully deployed at the minimum relative velocity. When the vehicle is protected by deploying the external airbag in a collision occurring at a relative velocity of a minimum of 44 km/h, a separation distance may be calculated at a relative velocity based on a time of 65 ms which is a minimum time required to deploy the external airbag, and the thickness of the airbag may be added to the separation distance, to obtain the limit of the real area which may be considered to be a minimum. In other words, the minimum value of the real area may be calculated as 1.5 m which is obtained by adding 0.7 m (e.g., the thickness of the airbag) to 0.8 m (e.g., a distance based on a relative velocity of 44 km/h and a time of 65 ms), that is, 0.7 m+0.8 m.

Further, the maximum value of the real area may be calculated as a value that is obtained by adding 0.7 m (e.g., the thickness of the airbag) to 2.9 m (e.g., a distance based on a maximum relative velocity of 160 km/h and a time of 65 ms), that is, 0.7 m+2.9 m, when the external airbag is deployed in a collision having a maximum relative velocity of 160 km/h.

However, the above indicates that a vehicle velocity is substantially high, wherein such a deployment operation may be possible only when a minimum recognition time required by a sensor, such as an imaging device, to identify an object, a time required by the sensor to sample measured values, and a time corresponding to the number of sampling times are additionally secured. Therefore, when the maximum value, 8.9 m which is a distance based on an imaging device determination time of 200 ms and a relative velocity of 160 km/h and 8.9 m which is a distance based on a time of 200 ms during which sampling at a sample time of 40 ms may be performed five times and a relative velocity of 160 km/h, are additionally required, and as a result, a maximum value of 21.4 m may be required.

Therefore, another object may be searched for in an area spaced apart from the front of the vehicle by at least 1.5 m, and then the airbag may be deployed. Further, another object may be searched for in an area spaced apart from the front of the vehicle by a maximum of 21.4 m, and then the airbag may be deployed. Therefore, other objects may be detected in a range in which the basic area and the real area overlap. However, when other objects are present both in the basic area and in the detection area, an object determined to be closest to the vehicle may be set as a target object. Alternatively, when only 10 objects may be covered and tracked in the real area, and 12 objects are detected, a criterion for elimination may be utilized to eliminate other objects detected in a section in which the basic area and the real area do not overlap.

Moreover, when any object is detected in such a detection area, the object may be called a detected object at step S140. The physical characteristics (e.g., the velocity, the location, and the like) of detected objects may be measured by a laser sensor or a radar sensor, and the type of the detected objects may be determined by an imaging device sensor. Further, identifications (IDs) may be assigned to the respective detected objects, and the relative physical characteristics of the detected objects based on the IDs are sensed and continuously updated In other words, the setting of the detected area may include recognizing (S210), by the controller, detected objects in the detection area using a front sensor; and assigning IDs to the detected objects, and updating (S220), by the controller, detected objects when measurement is performed by the front sensor.

Figure 4:
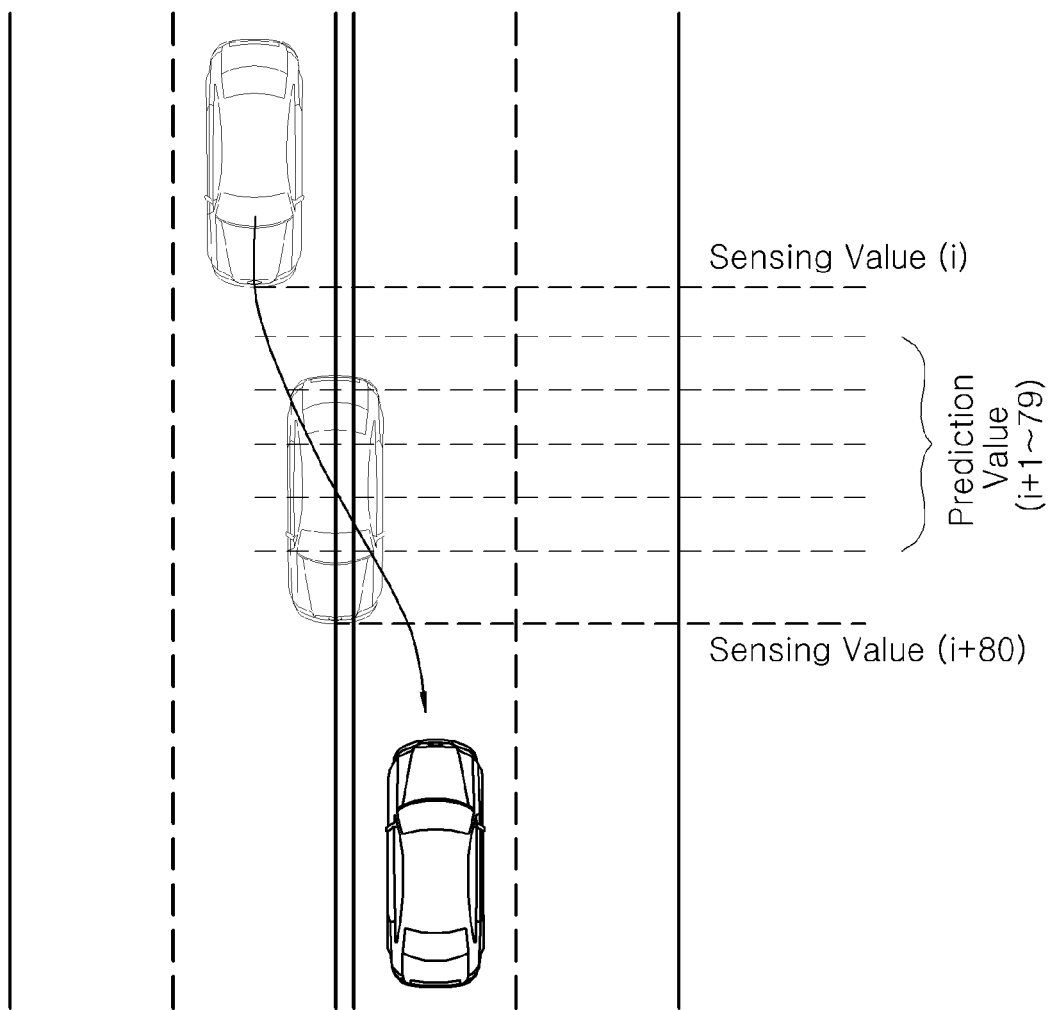
FIG. 4 is an exemplary diagram showing the prediction procedure of the external airbag deployment method according to an exemplary embodiment of the present invention.

Moreover, the measurement periods of the respective sensors may vary as illustrated in FIG. 4. FIG. 4 is an exemplary diagram showing the prediction procedure of the external airbag deployment method according to an exemplary embodiment of the present invention. In particular, the data regarding detected objects and a target object may be updated at intervals of the measurement period of the front sensor, and predicted data may be calculated at intervals of a predetermined time during each measurement period and may be used as data regarding the detected objects and the target object.

In other words, when the measurement period of the sensor is 80 ms, data may not provided during the measurement period of 80 ms. Therefore, the measured values may be updated at intervals of 80 ms which is the measurement period, and updated values may be predicted at intervals of 1 ms even during the measurement period.

For the above operation, as shown in the drawing, when it is assumed that the measurement by the sensor is performed at time i, a value at time i+1 is obtained using the value obtained at time i. The values may be obtained using a well-known tracking filter, such as an alpha-beta filter or a Kalman filter. Thereafter, at times ranging from i+1 to i+79, updating may be performed using individual values. This procedure may be understood by the following Equation (2):

$$\hat{x}_{i+2} = \hat{x}_{i+1} + \Delta T \hat{v}_{i+1}$$

$$\hat{v}_{i+2} = \hat{v}_{i+1} + \Delta T a_s, \text{TTE} = (\hat{x}_{i+2} - 0.7)/\hat{v}_{i+2} \quad (2)$$

($\Delta T$=1 ms, $a_s$: Self Vehicle Acceleration)

As described above, a subsequent position may be obtained using a previous position and a previous velocity (e.g., previously obtained), and a subsequent velocity may be continuously estimated using current acceleration, that is, acceleration at a time point at which the sensor performs measurement. Since this measurement may be performed for a substantially short time, the range of to errors decreases even when a subsequent velocity is calculated using the current acceleration. Further, time TTE may be obtained by subtracting 0.7 m which is the thickness of the airbag from a relative distance and by dividing the subtracted result value by a velocity, at intervals of a predetermined time, that is, 1 ms.

Moreover, the process may include selecting (S310), by the controller, an object having the shortest Time To EAB (TTE), from the detected objects in the detection area, as a dangerous object, wherein the TTE is the remaining time until the airbag cushion collides with the object when the external airbag is predicted to be deployed. Alternatively, the process may include selecting, by the controller, an object having the shortest Time To Collision (TTC), from the detected objects in the detection area, as a dangerous object, wherein the TTC is the remaining time until the object collides with the vehicle when the collision with the vehicle is predicted to occur. In other words, from the objects detected in the detection area, an object having the shortest TTE or TTC may be selected as a dangerous object.

Figure 6:
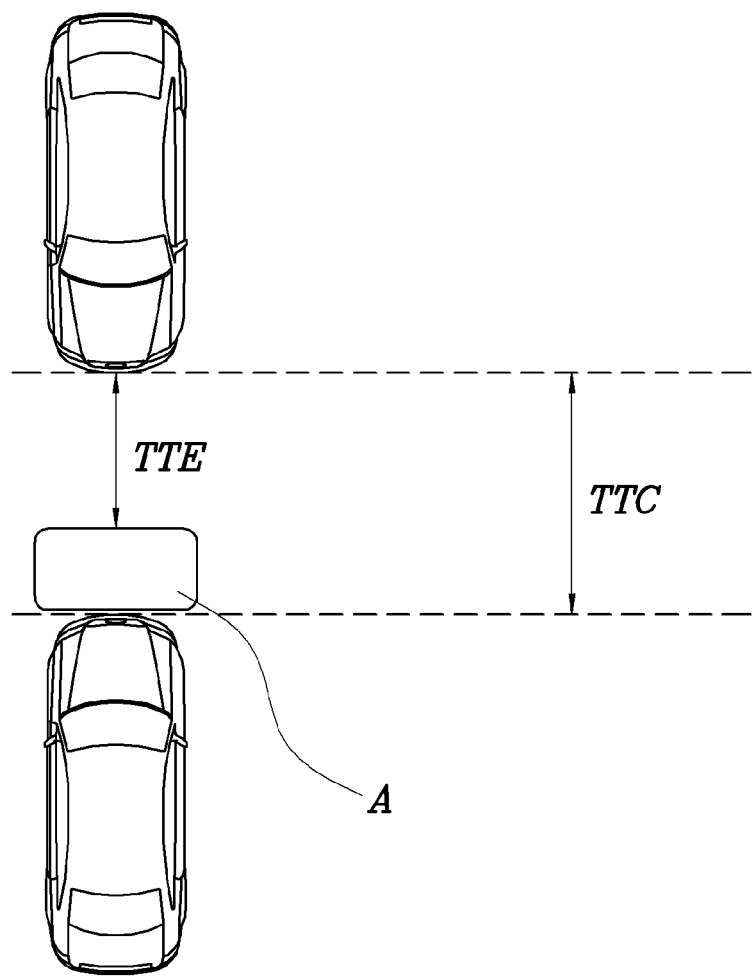
FIGS. 6 and 7 are exemplary diagrams showing TTC and TTE of the external airbag deployment method according to an exemplary embodiment of the present invention.
Figure 7:
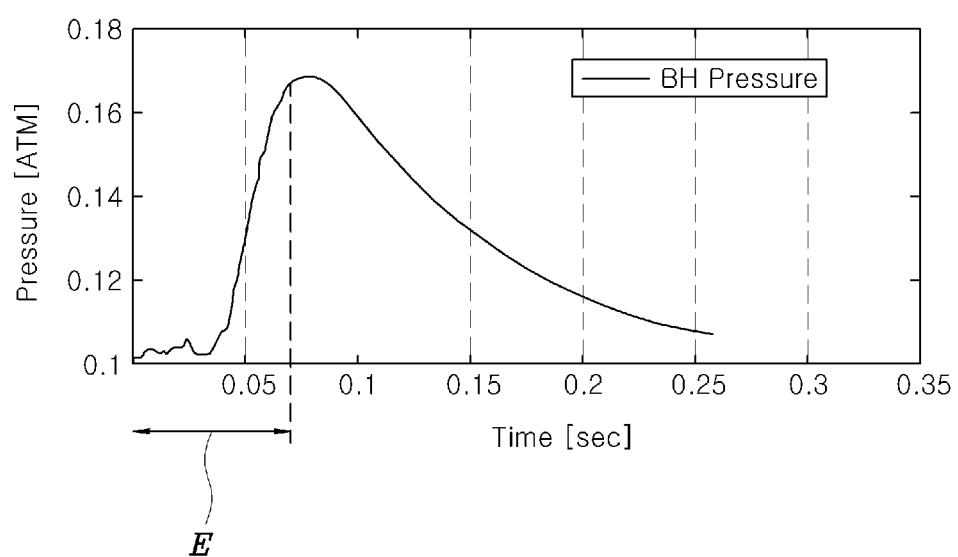

FIGS. 6 and 7 are exemplary diagrams showing TTC and TTE of the external airbag deployment method according to an exemplary embodiment of the present invention. In particular, a TTE denotes the remaining time until an object collides with an airbag cushion when the external airbag is predicted to be deployed, and a TTC denotes the remaining time until the object collides with the vehicle when the collision with the vehicle is predicted to occur.

In other words, as shown in FIG. 6, when the airbag is predicted to be deployed, a TTE denotes a time during which an object collides with the airbag when the airbag is fully deployed. In particular, as shown in FIG. 7, as time elapses during the deployment of the airbag, the pressure of the cushion may increase, the pressure may reach a maximum when the airbag is fully deployed, and the pressure may decrease after full deployment. To cause the object to collide with the airbag when the airbag is fully deployed, a time TTE may introduced. Therefore, the TTE may be obtained from the to distance of the current object, and the maximum shock absorption performance may be obtained when the airbag is caused to be deployed for the obtained time TTE. Additionally, a TTC denotes the remaining time until an object collides with the bumper of a vehicle, and is a concept frequently utilized in a conventional internal airbag mounted in the vehicle.

Therefore, in an autonomous vehicle, an object having the shortest TTC, which is the remaining time until the object collides with the vehicle when a collision with the vehicle is predicted to occur, may be selected from a plurality of objects detected in the detection area as a dangerous object. Alternatively, an object having the shortest TTE or TTC may be first selected from the objects detected in the detection area as a dangerous object.

Furthermore, as will be described below, the controller may be configured to determine whether to deploy the airbag while the dangerous object is being monitored. In other words, when the relative velocity of the dangerous object is greater than a first reference at step S320, an overlap is greater than a second reference at step S330, and a TTE is less than a third reference at step S340, the controller may be configured to select the dangerous object as a target object.

First, the relative velocity of the dangerous object may be monitored. Further, the relative velocity may be greater than a minimum of 44 km/h as the first reference since the minimum relative velocity, at which the vehicle must be protected in a collision with the dangerous object, is 44 km/h.

Figure 5:
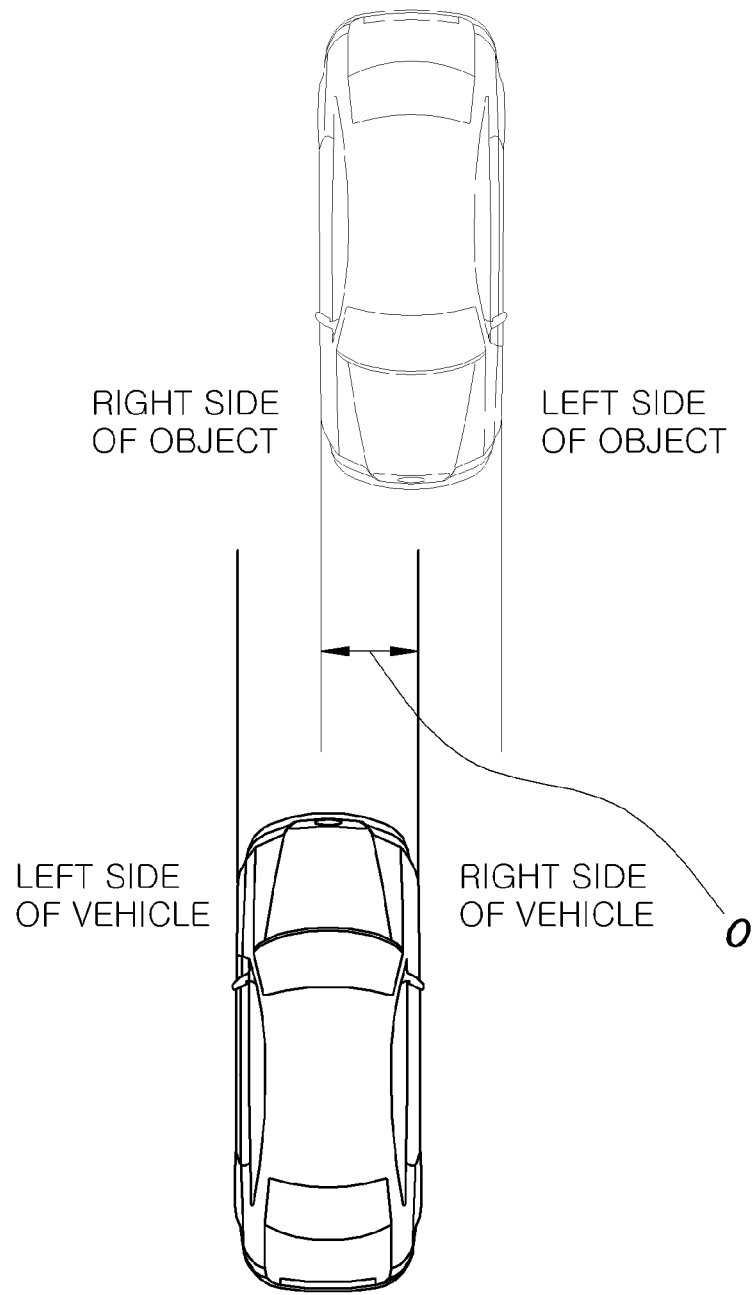
FIG. 5 is an exemplary diagram showing the overlap determination of the external airbag deployment method according to an exemplary embodiment of the present invention.

Furthermore, the overlap of the dangerous object with the vehicle may be greater than 20% as the second reference. As shown in FIG. 5, a greater of the left boundary value of an autonomous vehicle and the right boundary value of an object may be selected, and a smaller of the right boundary value of the autonomous vehicle and the left boundary value of the object may be selected. Then, the values between the selected boundary values may be considered to be an overlap distance, and the overlap distance may be divided by the width of the autonomous vehicle, and thereafter the divided result value may be multiplied by 100 and to be represented as a percentage. Therefore, when an object recognized as the dangerous object has a substantially high relative velocity and a substantially large overlap, the object may be selected as the target object.

Furthermore, the dangerous object may be selected as a target object when a TTE is less than the third reference since when the dangerous object has a substantially high relative velocity, a substantially large overlap, and a substantially short collision time, the dangerous object may be an object having an increased risk of collision.

Moreover, after the above procedure, the process may include determining (S350), by the controller, whether the vehicle is stable by comparing the predicted yaw rate of the vehicle with a measured yaw rate is performed. In other words, the controller may be configured to determine whether the driving stability of the autonomous vehicle may be maintained by considering the vehicle to be an object having a two-degree-of-freedom. In particular, when a difference between the actual yaw rate of the vehicle and the predicted yaw rate is greater than a predetermined level, the controller may be configured to determine that the vehicle is unstable. This technology is frequently utilized in conventional vehicle posture maintenance technology, that is, Electronic Stability Program (ESP) or the like, and thus a detailed description thereof will be omitted here.

Figure 8:
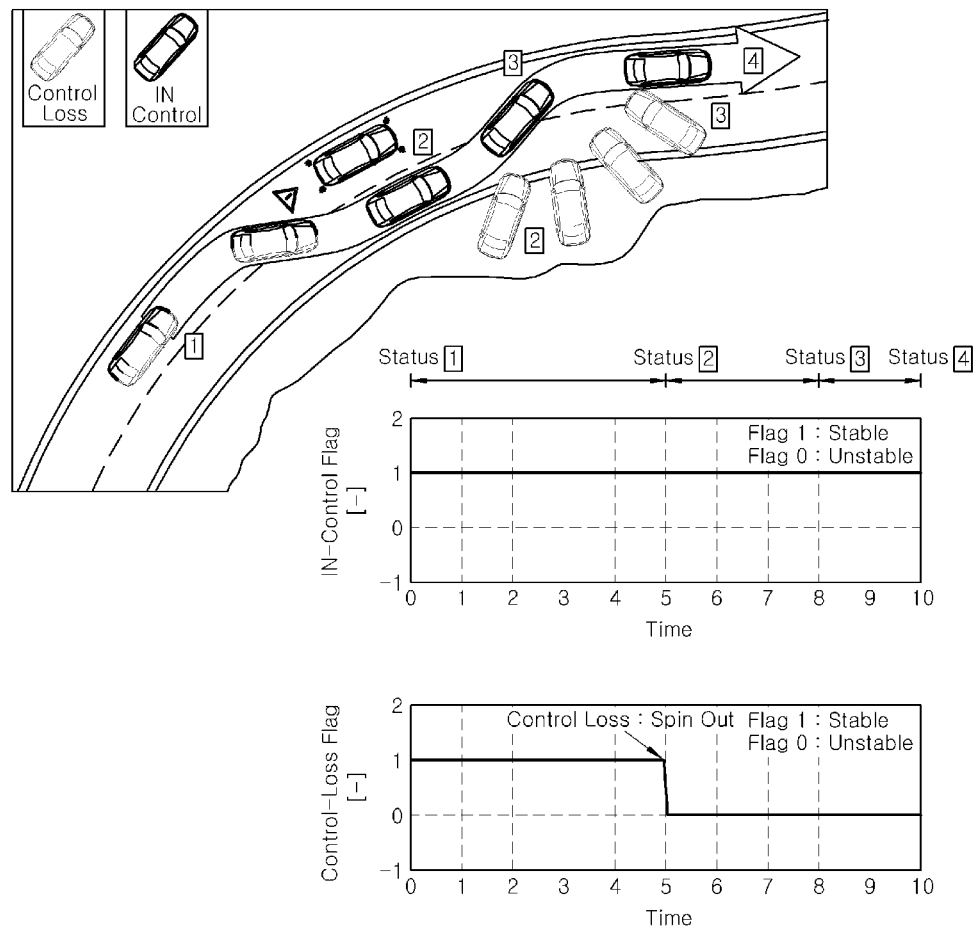
FIG. 8 is an exemplary diagram showing the stability determination step of the external airbag deployment method according to an exemplary embodiment of the present invention.

FIG. 8 is an exemplary diagram showing the stability determination step of the external airbag deployment method according to an exemplary embodiment of the present invention. In FIG. 8, flag 1 indicates a state when the vehicle is driven in a condition of maintaining traction stability, and the process proceeds to a situation in which the external airbag may be deployed. When traction stability is lost, as indicated by flag 0 in FIG. 8, the external airbag may not be deployed. Therefore, the external airbag may be deployed during unstable driving conditions.

Thereafter, the steps S410, S420, S430, and S440 of determining whether a relative velocity and an overlap, predicted when a vehicle collision is predicted to occur, are greater than predetermined levels are performed. Further, the predetermined levels at the prediction step and the deployment step may be the first reference for the relative velocity and may be the second reference for the overlap.

Figure 9:
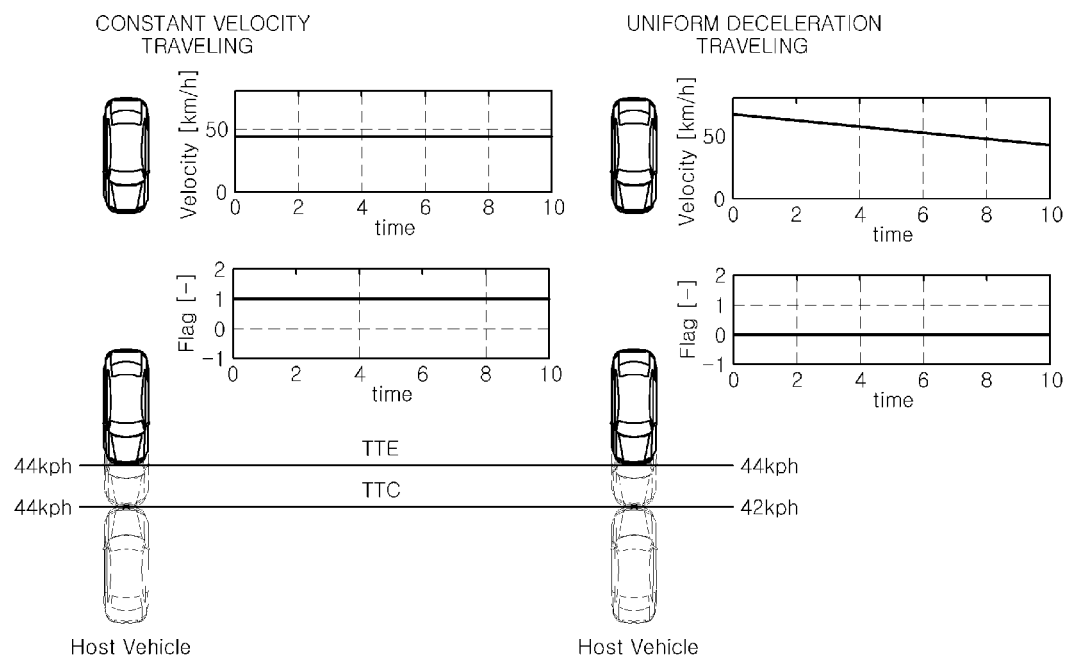
FIGS. 9 and 10 are exemplary diagrams showing the prediction step of the external airbag deployment method according to an exemplary embodiment of the present invention.
Figure 10:
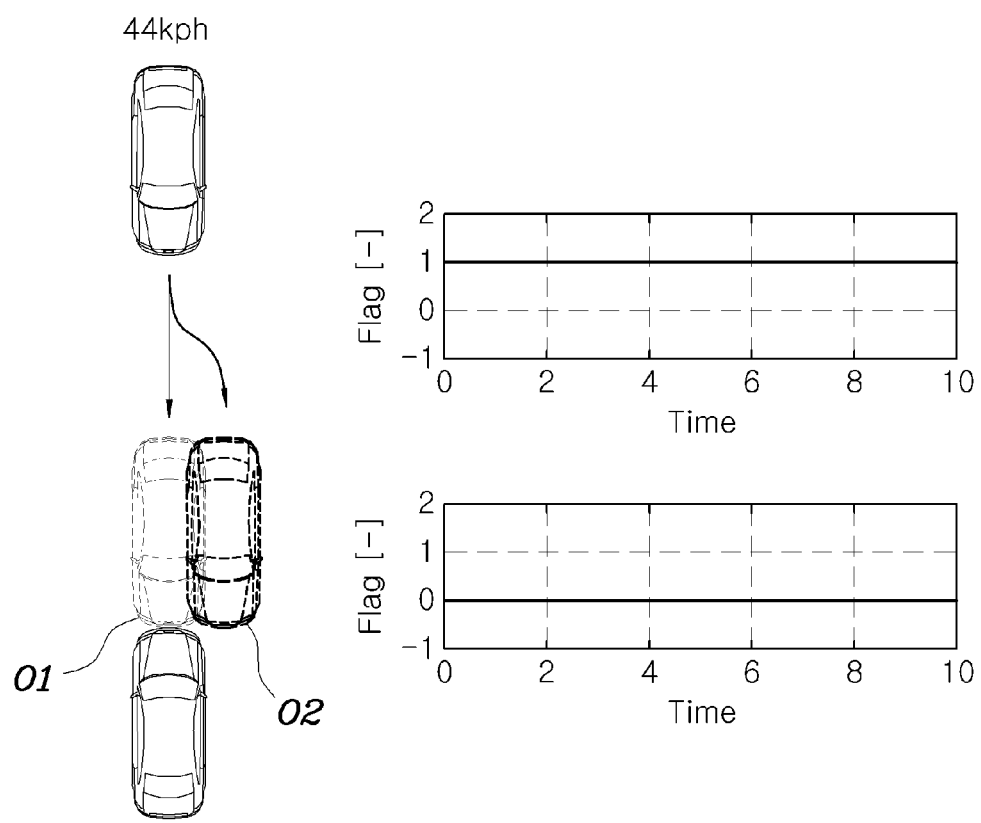

FIGS. 9 and 10 are exemplary diagrams showing the prediction step of the external airbag deployment method according to an exemplary embodiment of the present invention. In FIGS. 9 and 10, when an autonomous vehicle and a target object are traveling at a substantially constant velocity, the relative velocity may be maintained to be greater than the first reference. However, when the autonomous vehicle and the target object are traveling while decelerating, the velocity may decrease to a velocity of 42 km/h lower than the first reference (e.g., 44 km/h). Thus, the external airbag need not be deployed.

Therefore, even when the current relative velocity of the target object exceeds a minimum reference value of 44 km/h and when a predicted value at the collision time does not exceed 44 km/h, the airbag may not be deployed. This may be illustrated by obtaining the mean of relative velocities obtained for a predetermined period of time, dividing the mean by time to obtain a relative acceleration, predicting a relative velocity at a TTC based on the relative acceleration, and then tracking the target object.

Further, as shown in FIG. 10, an overlap appearing at a time TTC, that is, at the time of collision, may be predicted, and whether a collision will occur at an overlap of 20% or more may be predicted. Similarly, an overlap may be predicted by obtaining the mean of lateral relative velocities obtained to a current time, and tracking a lateral relative displacement at a time TTC based on the mean.

Thus, the present invention may prevent false deployment of the external airbag by preventing the external airbag from being deployed when the relative velocity predicted at a TTC, that is, the time of a collision, does not exceed 44 km/h or when the overlap predicted at a TTC does not exceed 20% even when the current relative velocity exceeds 44 km/h and the current overlap exceeds 20%.

Further, when the predicted relative velocity and the predicted overlap of the target object are greater than the predetermined levels, and collision probability (CP) and a variation in CP are greater than predetermined levels, the external airbag may be deployed at steps S510 and S520. That is, the collision probability (CP) may be defined by the following Equation (3):

$$CP = \frac{1}{TTC} \quad (3)$$

or $$CP = \frac{Overlap}{TTC}$$

Therefore, a TTC may be obtained by the above equation, and CP may be obtained by taking a reciprocal of TTC or by multiplying the amount of overlap by the reciprocal of TTC. The actual CP may be considered to be substantially high when the obtained CP exceeds a predetermined value, causing the airbag to be deployed, thus preventing the false deployment of the airbag.

Further, the collision probability may be calculated at intervals of 1 ms, thus when the slope of the rate of a variation in CP is less than a predetermined slope, the airbag may not be deployed, and thus the false deployment of the airbag may prevented.

Figure 11:
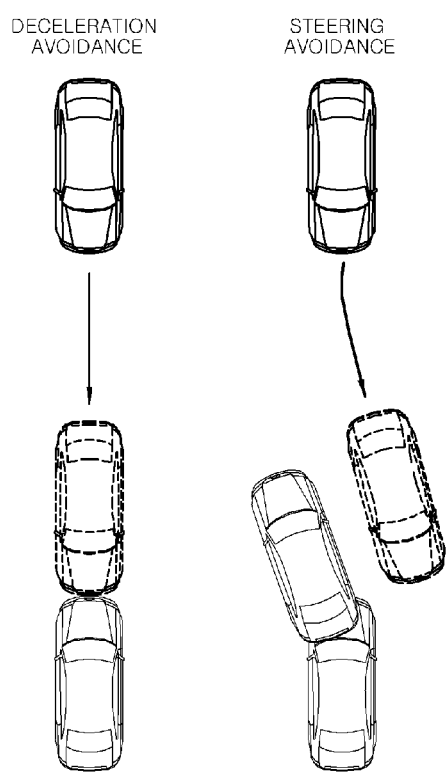
FIGS. 11 to 13 are exemplary diagrams showing the avoidance step of the external airbag deployment method according to an exemplary embodiment of the present invention.
Figure 11:
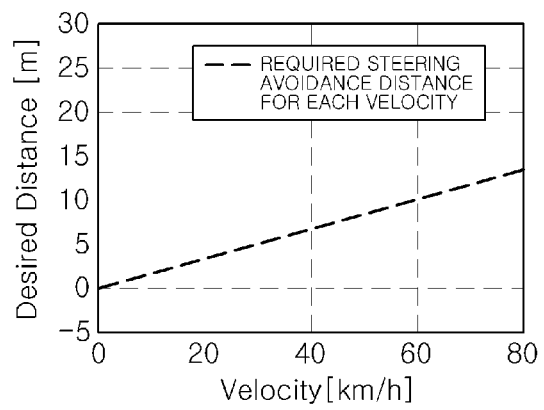
Figure 11:
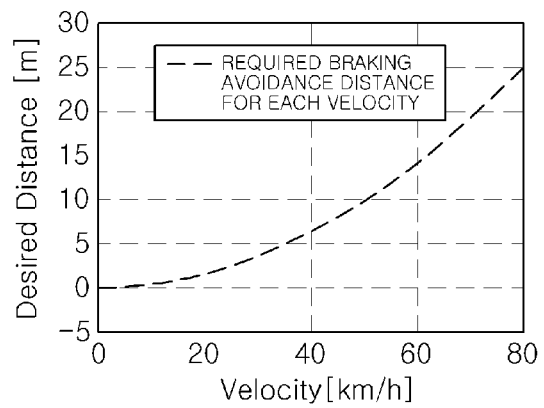
Figure 12:
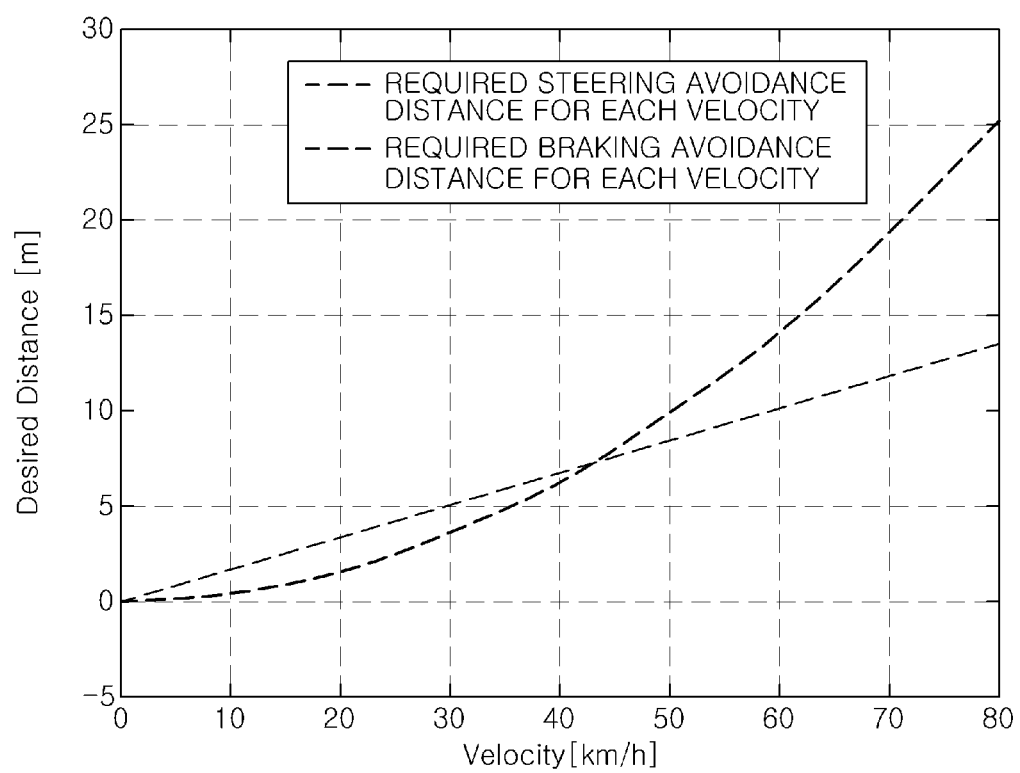
Figure 13:
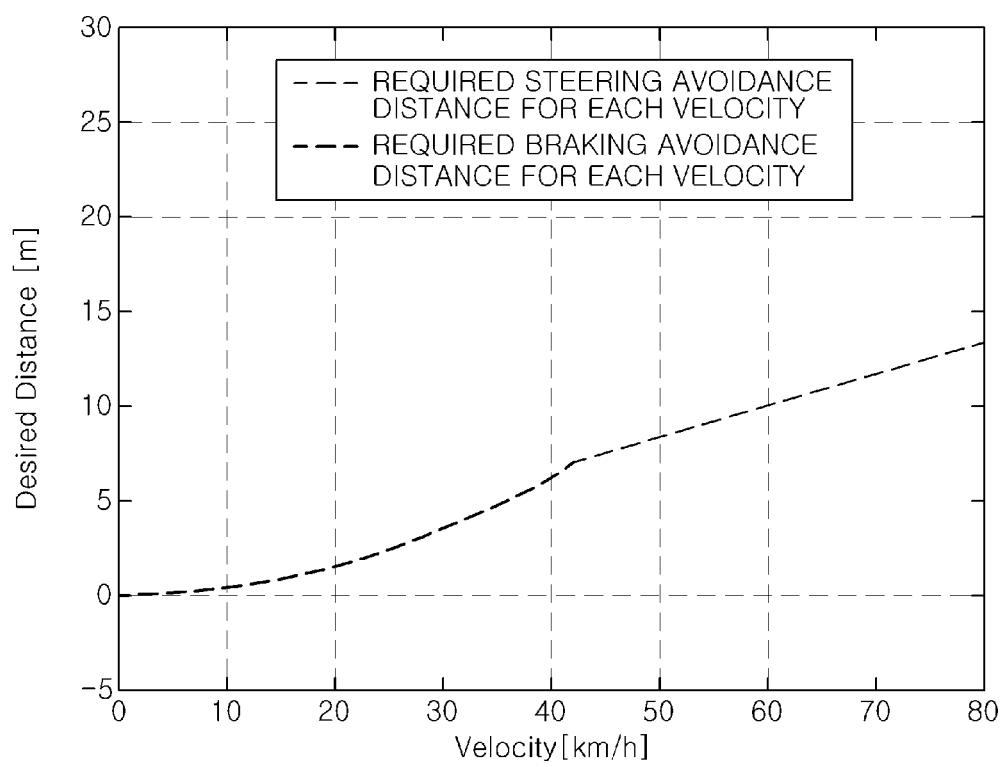

Moreover, when a distance between the vehicle and the target object is less than a required steering avoidance distance and a required braking avoidance distance, the external airbag may be deployed (that is, Point Of No Return: PONR may be calculated) at step S530 and S540. FIGS. 11 and 13 are exemplary diagrams showing the avoidance step of the external airbag deployment method according to an exemplary embodiment of the present invention. In the drawings, a vehicle may avoid a collision using deceleration or steering, as represented by a relationship between a relative velocity and a relative distance.

Therefore, respective graphs for a required steering avoidance distance and a required braking avoidance distance versus a relative velocity overlap each other. A portion under a common denominator of the graphs, that is, the curve of the graph of FIG. 13, indicates that even when braking or steering is sufficiently conducted, a collision may not be avoided. Therefore, the airbag may be deployed, while preventing the false operation of the airbag.

The required braking avoidance distance may be given by the following Equation (4):

$$d_{braking} = \frac{v_0^2 - v^2}{2a_x} \quad (v = 0, a_x = 1.0 \text{ g}) \qquad (4)$$

This distance denotes a function of dividing a square of the relative velocity by twice the acceleration of gravity g.

Further, the required steering avoidance distance may be given by the following Equation (5):

$$d_{steering} = \sqrt{\frac{2 \cdot o_i}{a_y}} \cdot v_{rel} \qquad (5)$$

$o_i$ = current overlap amount $\sqrt{\frac{2 \cdot o_i}{a_y}} =$ time required to avoid current overlap amount ($o_i$) using $a_y$(1.0 g)

The above Equation may obtain the required steering avoidance distance by dividing twice the current overlap amount by a lateral relative velocity, taking a square root of the divided result value, and multiplying the lateral relative velocity by the square root.

Moreover, after this procedure has been performed, of the process may include validating (S560), by the controller, the presence of the target object using an ultrasonic sensor, to prevent sensor errors. Then, the controller may be configured to check (S570) whether communication and parts are operating, and then process may include deploying (S580), by the controller, the external airbag.

The external airbag deployment method according to the present invention will be summarized again below. First, a detection area may set based on the deployment characteristics of an external airbag, thus reducing the burden of data processing by monitoring data regarding detected objects. Further, data may be predicted and calculated during each measurement period of a sensor, to generate data at intervals of 1 ms.

After dangerous objects have been selected based on a TTC and a TTE, a corresponding dangerous object may be selected as a target object based on a relative velocity, an overlap, and a TTE, thus specifying and continuously tracking the object based on the actual collision situation of the vehicle.

Furthermore, even when an object is selected as a target object, the target object may be filtered based on a relative velocity and an overlap at a time TTC, thus preventing false deployment, and the target object may be filtered based on collision probability (CP), a variation in CP, vehicle stability, a required steering avoidance distance, and a required braking avoidance distance, thus decreasing risk of a false operation.

As described above, according to an external airbag deployment method having the above-described configuration, the present invention provides a control method capable of preventing false deployment and obtaining effective deployment by determining collisions. Further, the present invention provides a data management method capable of supporting measurement performance even when the measurement performance of a sensor is insufficient Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An external airbag deployment method comprising:
   setting, by a controller, a detection area located in front of a vehicle;
   selecting, by the controller, an object as a target object from objects detected in the detection area, when an object has a relative velocity greater than a first reference, an overlap greater than a second reference, and a Time To EAB (External Airbag) (TTE) less than a third reference, wherein TTE is a remaining time until the object collides with an airbag cushion when the external airbag is predicted to be deployed;
   determining, by the controller, whether the vehicle is stable by comparing a predicted yaw rate of the vehicle with a measured yaw rate;
   determining, by the controller, whether a relative velocity and an overlap, predicted at a time when the target object is predicted to collide with the vehicle, are greater than predetermined levels;
   determining, by the controller, whether a collision probability based on a reciprocal of a Time To Collision (TTC) and a variation in collision probability are greater than predetermined levels, wherein the TTC is a remaining time until the target object collides with the vehicle when the target object is predicted to collide with the vehicle; and
   deploying, by the controller, the external airbag when the vehicle is stable, the predicted relative velocity and overlap of the target object are greater than the predetermined levels, and the collision probability and the variation in the collision probability are greater than predetermined levels.

2. The external airbag deployment method of claim 1, further comprising:
   calculating, by the controller, a required steering avoidance distance and a required braking avoidance distance based on a relative velocity of the target object;
   comparing, by the controller, a distance to the target object with the required steering avoidance distance and the required braking avoidance distance; and
   deploying the external airbag when the vehicle is stable, the predicted relative velocity and overlap of the target object are greater than the predetermined levels, and the distance to the target object is less than the required steering avoidance distance and the required braking avoidance distance.

* * * * *